(12) United States Patent
Yanai et al.

(10) Patent No.: US 7,654,542 B2
(45) Date of Patent: Feb. 2, 2010

(54) ALL TERRAIN VEHICLE

(75) Inventors: Hideo Yanai, Saitama (JP); Tomokazu Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 396 days.

(21) Appl. No.: 11/354,108

(22) Filed: Feb. 15, 2006

(65) Prior Publication Data
US 2006/0180385 A1 Aug. 17, 2006

(30) Foreign Application Priority Data
Feb. 15, 2005 (JP) ............................. 2005-037825
Feb. 15, 2005 (JP) ............................. 2005-037932

(51) Int. Cl.
B62D 7/22 (2006.01)
(52) U.S. Cl. ......................... 280/89; 280/272; 180/417
(58) Field of Classification Search .................. 380/89, 380/272; 180/417
See application file for complete search history.

(56) References Cited
U.S. PATENT DOCUMENTS 1,610,057 A * 12/1926 Humphrey ................... 280/89
4,660,845 A    4/1987 Herr
4,700,963 A *  10/1987 Burns et al. ................. 280/276
6,170,841 B1 * 1/2001 Mizuta ......................... 280/89
2007/0095601 A1 * 5/2007 Okada et al. ................ 180/444

FOREIGN PATENT DOCUMENTS

| JP | 03-1877 | * | 1/1991 |
| JP | 3-1877 U | | 1/1991 |
| JP | 8-336237 A | | 12/1996 |
| JP | 2005-020407 | * | 1/2005 |

* cited by examiner

Primary Examiner—Lesley D Morris
Assistant Examiner—Marlon A Arce
(74) Attorney, Agent, or Firm—Birch, Stewart, Kolasch & Birch, LLP

(57) ABSTRACT

To reduce a load on an electric motor for a power assisted motor-driven power steering apparatus. The present invention includes side projecting portions secured to an input shaft with an upwardly projecting tab as a first stopper secured to a vehicle body at a position corresponding to the side projecting portions. The upwardly projecting tab being provided for restricting a swing range of the side projecting portions. The side projecting portions are secured to an output shaft. A downwardly projecting portion is provided as a second stopper secured to the vehicle body at a position corresponding to the side projecting portions. The downwardly projecting portion being provided for restricting a swing range of the side projecting portions.

16 Claims, 8 Drawing Sheets

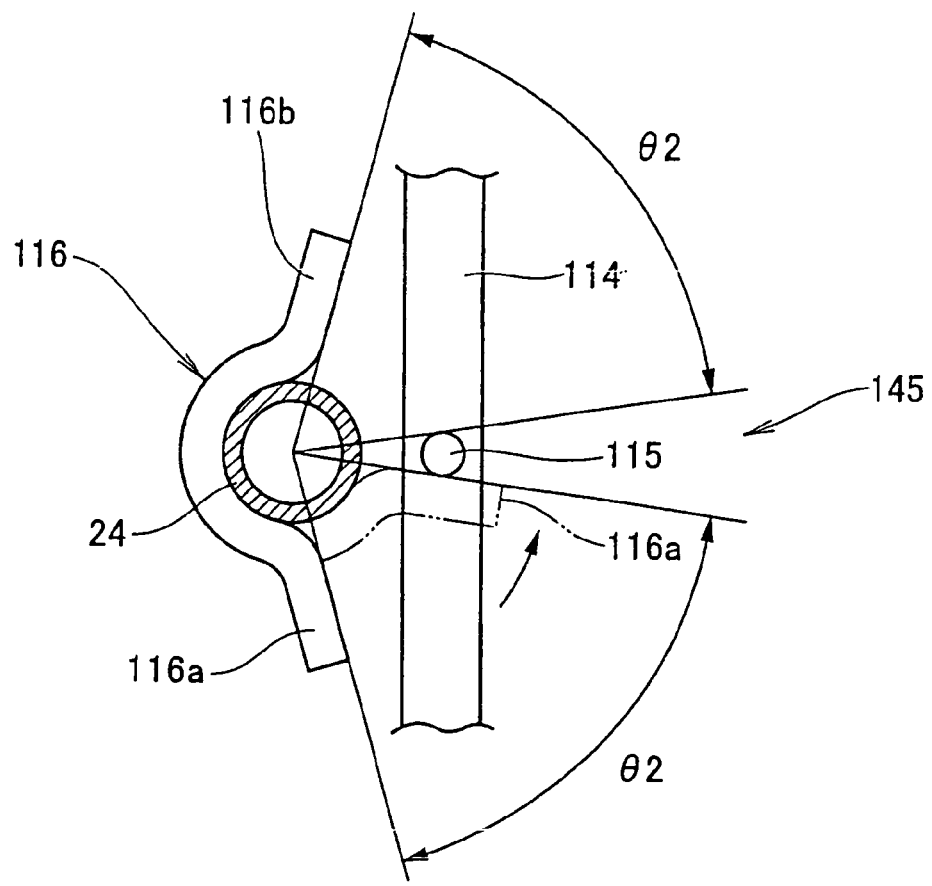
FIG. 6
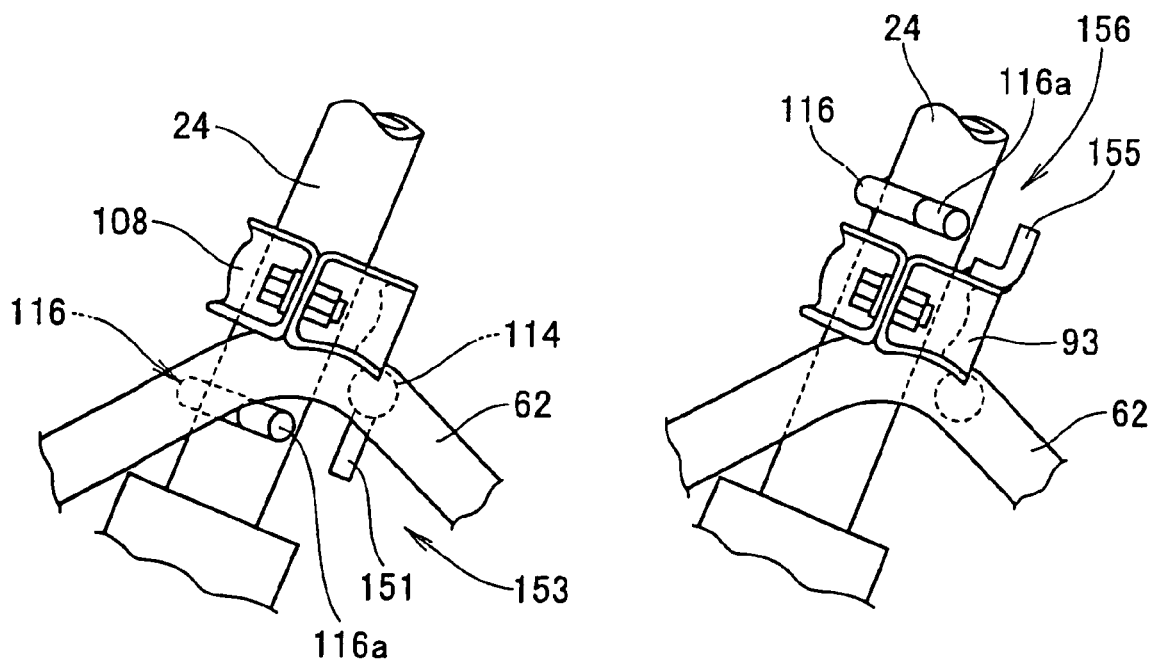
FIG. 7(a)  FIG. 7(b)

ALL TERRAIN VEHICLE

CROSS-REFERENCE TO RELATED APPLICATIONS

The present application claims priority under 35 USC 119 to Japanese Patent Application No. 2005-037825 filed on Feb. 15, 2005 and Japanese Patent Application No. 2005-037932 filed on Feb. 15, 2005 the entire contents of which are hereby incorporated by reference.

FIELD OF THE INVENTION

The present invention relates to an improved all terrain vehicle.

DESCRIPTION OF BACKGROUND ART

A known type of the all terrain vehicle includes a motor-driven power steering apparatus disposed between an input shaft connected to an operating handlebar and an output shaft connected to a wheel side. See, for example, Japanese Utility Model Laid-open No. Hei 3-1877.

FIGS. 1 and 6 of Japanese Utility Model Laid-open No. Hei 3-1877 show an arrangement wherein an input shaft 5 is installed on a lower portion of an operating handlebar 3 with an output shaft 11 being connected to the input shaft 5 via a motor-driven power steering apparatus. The motor-driven power steering apparatus includes a torsion bar 19 disposed between the input shaft 5 and the output shaft 11. In addition, a stopper mechanism 101 is disposed on the side of the input shaft 5. The stopper mechanism 101 includes a lock member 103 that projects from the input shaft 5 and a pair of stopper members 105 projecting from a chassis 37. The stopper mechanism 101 restricts the maximum steering angle of the operating handlebar 3.

The motor-driven power steering apparatus includes a steering torque sensor 7 that includes the torsion bar 19, a reduction gear mechanism 9, a drive motor 17, a control unit 15 shown in FIG. 3 of Japanese Utility Model Laid-open No. Hei 3-1877 and the like.

The input shaft 5 is rotated with the operating handlebar 3 to twist the torsion bar 19. This produces a relative rotational angle in the input shaft 5 and the output shaft 11. A potentiometer detects this relative rotational angle and a signal corresponding to the detected relative rotational angle is applied to the control unit. Based on the signal, the control unit 15 controls the drive motor 17 so as to give the side of the output shaft 11 a driving force corresponding to a steering torque detected by the steering torque sensor 7.

FIGS. 5 and 8 of Japanese Utility Model Laid-open No. Hei 3-1877 illustrate a stopper mechanism 33 on the side of the output shaft 11. The stopper mechanism 33 includes a lock member 35 projecting from the output shaft 11 and a pair of stopper members 39 mounted on the chassis 37. The stopper mechanism 33 restricts a range of rotational angles of the output shaft 11.

Assuming that the motor-driven power steering apparatus includes only the stopper mechanism 101 on the side of the input shaft 5 as shown in FIG. 1 of Japanese Utility Model Laid-open No. Hei 3-1877. Further assuming a condition, in which the operating handlebar 3 is turned until the lock member 103 contacts the stopper member 105 of the chassis 37. Even in this condition, the wheels of a vehicle can be forcibly turned clockwise or counterclockwise by bumps and potholes in a road surface. As the wheels are turned clockwise and counterclockwise, the output shaft 11 can be rotated through a rotational angle greater than the rotational angle of the input shaft 5. This produces a relative rotational angle in the input shaft 5 and the output shaft 11, thus operating the drive motor 17 and increasing power consumption of the drive motor 17.

Assuming, on the other hand, that the motor-driven power steering apparatus includes only the stopper mechanism 33 on the side of the output shaft 11 as shown in FIGS. 5 and 8 of Japanese Utility Model Laid-open No. Hei 3-1877. Further assuming a condition, in which the wheels of the vehicle are forcibly turned clockwise or counterclockwise by bumps and potholes in the road surface, causing the stopper member 39 of the stopper mechanism 33 to abut on the lock member 35. Even in this condition, as the wheels are turned clockwise and counterclockwise, the input shaft 5 can be rotated through a rotational angle greater than the rotational angle of the output shaft 11. This produces a relative rotational angle in the input shaft 5 and the output shaft 11, thus operating the drive motor 17 and again increasing the power consumption of the drive motor 17.

SUMMARY AND OBJECTS OF THE INVENTION

It is therefore an object of an embodiment of the present invention to improve the all terrain vehicle and to reduce load on a power assist motor included in the motor-driven power steering apparatus.

To achieve the foregoing object, according to an embodiment of the present invention an all terrain vehicle is provided having an input shaft disposed on the side of a handlebar and an output shaft disposed on the side of the left and right wheels, the input shaft and the output shaft are connected together via a motor-driven power steering apparatus for driving a power assist motor included in the motor-driven power steering apparatus in accordance with a relative rotational angle in the input shaft and the output shaft. A first lock member is secured to the input shaft with a first stopper secured to a vehicle body at a position corresponding to the first lock member. The first stopper is provided for restricting a swing range of the first lock member. A second lock member is secured to the output shaft with a second stopper secured to the vehicle body at a position corresponding to the second lock member. The second stopper is provided for restricting a swing range of the second lock member.

The first lock member secured to the input shaft and the first stopper secured to the vehicle body at the position corresponding to the first lock member restrict a rotational angle range of the input shaft. The second lock member secured to the output shaft and the second stopper secured to the vehicle body at the position corresponding to the second lock member restrict a rotational angle range of the output shaft.

Restricting the rotational angle range of the input shaft prevents the input shaft from rotating in excess of a predetermined rotational angle range by handlebar operation. Restricting the rotational angle range of the output shaft prevents the output shaft from rotating in excess of a predetermined rotational angle range via wheels by a road surface having bumps and potholes. Accordingly, the relative rotational angle of the input shaft or the output shaft is kept within a predetermined angle. Even when the rotation of either the input shaft or the output shaft is restricted, an excessive torque can, for example, be prevented from being applied to a torque sensor portion. This reduces the load being applied to the power assist motor.

According to an embodiment of the present invention, the first stopper and the second stopper make a rotational range of the input shaft equivalent to a rotational range of the output shaft.

The rotational range of the input shaft is made to be equal to the rotational angle of the output shaft by the first stopper and the second stopper. Accordingly, when the rotational range of the input shaft is restricted by the first stopper, the same rotational range is also restricted for the output shaft by the second stopper. When the input shaft and the output shaft are rotated through their maximum rotational angles, the relative rotational angle of the input shaft and the output shaft becomes zero and the power assist motor is stopped.

According to an embodiment of the present invention, the input shaft and the output shaft are connected via a torsion bar.

Rotation of the input shaft is transmitted to the output shaft via the torsion bar. If the rotational range of the input shaft is restricted by the first stopper and the rotational angle of the output shaft is restricted by the second stopper, there is no chance that the torsion bar will be twisted excessively.

According to an embodiment of the present invention, the second lock member is disposed on a center arm that is mounted on the output shaft and connected to left and right tie rods for steering the left and right wheels.

Since the second lock member is disposed on the center arm, the center arm serves also as a supporting portion for the second lock member.

According to an embodiment of the present invention, the first lock member is disposed upwardly of a bearing portion of the input shaft and the second lock member is disposed downwardly of a bearing portion of the output shaft.

The first lock member is disposed upwardly of the bearing portion of the input shaft so as to be away from the torsion bar and the second lock member is disposed downwardly of the bearing portion of the output shaft so as to be away from the torsion bar. Even if, for example, the input shaft or the output shaft rotates more than the predetermined rotational range because of part-to-part manufacturing variations involved in the position at which the first lock member is locked by the first stopper or the second lock member is locked by the second stopper, torque transmitted from the side of the input shaft or the side of the output shaft to the torsion bar is made smaller by a twist in a torque transmission path involved midway therebetween.

According to an embodiment of the present invention, the all terrain vehicle includes the first lock member on the side of the input shaft, the first stopper on the side of the vehicle body, the second lock member on the side of the output shaft, and the second stopper on the side of the vehicle body. This means that the first stopper and the second stopper are disposed on an upstream side and a downstream side, respectively, in transmission of a steering force of the motor-driven power steering apparatus. This allows the rotational range of the input shaft through operation of the handlebar to be restricted. Accordingly, even when the vehicle negotiates a road surface having bumps and potholes, it is possible to restrict the rotational range of the output shaft that can be varied by the wheels turned forcibly clockwise or counterclockwise by the road surface. This makes it possible to positively maintain the relative rotational angle in the input shaft and the output shaft within a predetermined angle or less. Accordingly, it is possible, for example, to prevent an excessive torque from being applied to the torque sensor portion and thus reduce load on the power assist motor.

According to an embodiment of the present invention, the first stopper and the second stopper make the rotational range of the input shaft equivalent to the rotational range of the output shaft. Accordingly, when the input shaft is locked on the first stopper, the output shaft is invariably locked on the second stopper. As a result, the power assist motor is not started. Accordingly, power consumption of the power assist motor can be reduced and the amount of discharge from the battery can be suppressed.

According to an embodiment of the present invention, the input shaft and the output shaft are connected via the torsion bar. Accordingly, the torsion bar can be prevented from being excessively twisted by restricting the rotational range of each of the input shaft and the output shaft using the first stopper and the second stopper, respectively.

According to an embodiment of the present invention, the second lock member is disposed on the center arm. This allows the center arm to serve also as the supporting member for the second lock member. The number of parts used can thereby be reduced for a reduction in cost.

According to an embodiment of the present invention, the first lock member is disposed upwardly of the bearing portion of the input shaft and the second lock member is disposed downwardly of the bearing portion of the output shaft. The first lock member and the second lock member are arranged away from the torsion bar. This helps make it more difficult for a large torque to be transmitted from the side of the input shaft or the side of the output shaft to the torsion bar. As a result, the torsion bar can be further prevented from being twisted excessively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a cross-sectional view taken along line 6-6 of FIG. 3;

FIGS. 7(a) and 7(b) are side-elevational views showing principal parts of an input shaft stopper mechanism according to other embodiments of the present invention;

DETAILED DESCRIPTION OF THE PREFERRED EMBODIMENTS

Figure 1:
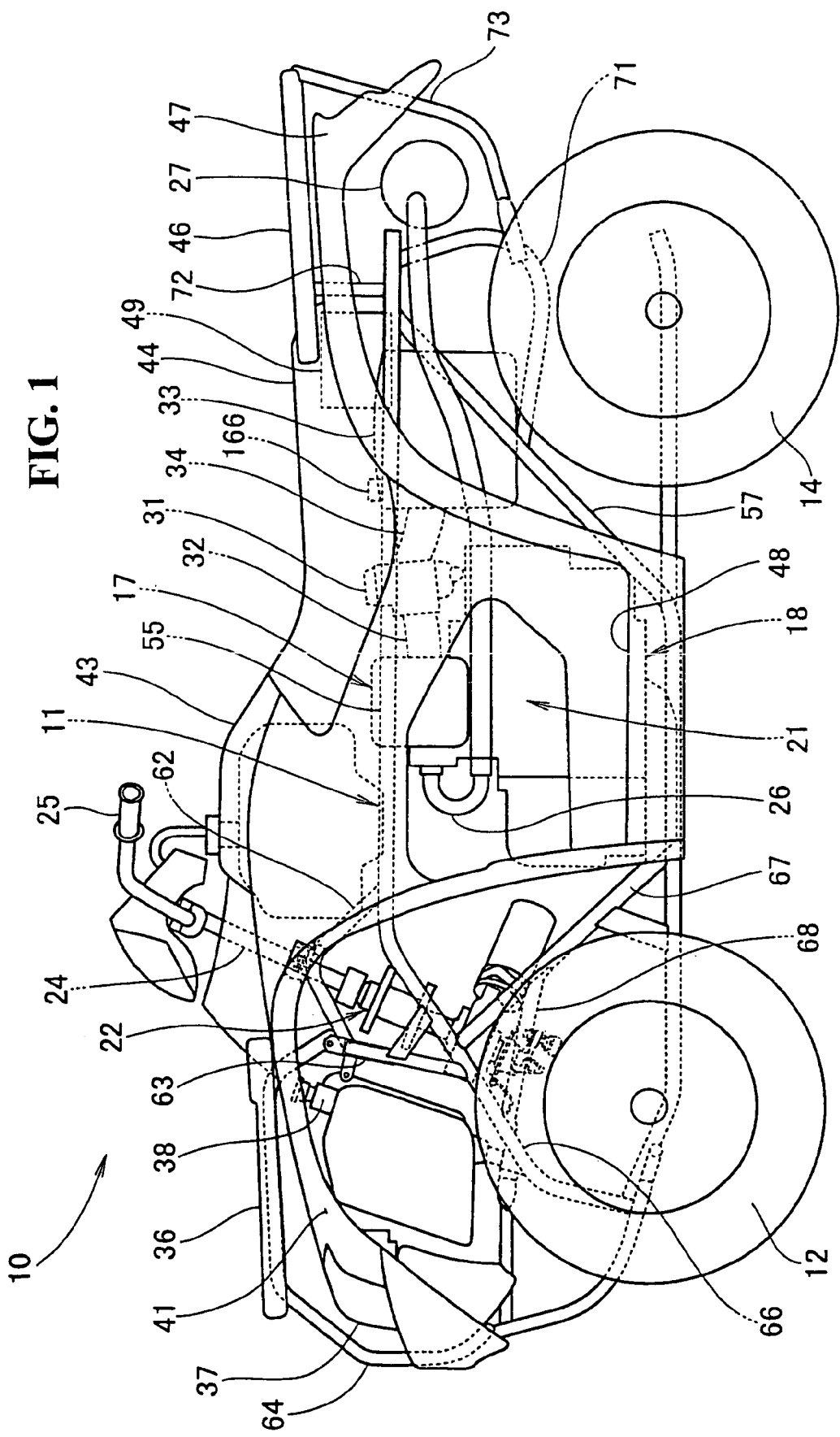
FIG. 1 is a side elevational view showing all terrain vehicle according to an embodiment of the present invention.

The best mode for carrying out the present invention will be described below with reference to the accompanying drawings. The drawings should be viewed in the direction of reference numerals.

FIG. 1 is a side elevational view showing an all terrain vehicle according to an embodiment of the present invention. All terrain vehicle 10 is a four-wheel-drive vehicle including front wheels 12, 13 (only reference numeral 12 representing the front wheel on a proximal side is shown), rear wheels 14, 15 (only reference numeral 14 representing the rear wheel on the proximal side is shown), and a power unit 21. The front wheels 12, 13 are mounted on a front portion of a vehicle body frame 11 via a suspension arm not shown. The rear wheels 14, 15 are mounted on a rear portion of the vehicle body frame 11 via a suspension arm not shown. The power unit 21, including an engine 17 and a transmission 18, is mounted at a central portion of the vehicle body frame 11. The power unit 21 drives the front wheels 12, 13 and the rear wheels 14, 15. The all terrain vehicle 10 further includes a motor-driven power steering apparatus 22 and a manual switch 166. The motor-driven power steering apparatus 22 includes a power assist portion (not shown) for reducing a steering force required for steering the front wheels 12, 13. The manual switch 166 allows a supply of electric power to the motor-driven power steering apparatus 22 to be shut down.

An input shaft 24 forming part of the motor-driven power steering apparatus 22 is a member that is rotated through an operation of a handlebar 25 mounted on an upper portion of the input shaft 24.

An exhaust pipe 26 extends from a front portion of the engine 17 rearwardly with a muffler 27 being connected to a rear end of the exhaust pipe 26. A carburetor 31 is connected to a rear portion of the engine 17 via an intake pipe 32 with an air cleaner 33 being connected to the carburetor 31 via a connecting tube 34. The all terrain vehicle 10 includes a front carrier 36 together with a headlamp 37, a radiator 38, a front fender 41, a fuel tank 43 and a seat 44 that can be opened or closed by a simple operation, for example, by operating a lever exposed from a vehicle body (to be described in detail later). In addition, a rear carrier 46 is provided together with a rear fender 47 and a step floor 48.

A battery 49 is disposed downwardly of a rear portion of the seat 44 for supplying the motor-driven power steering apparatus 22 with electric power.

The vehicle body frame 11 includes a pair of left and right upper main frames 55, 56 (only reference numeral 55 representing the upper main frame on the proximal side is shown), a pair of left and right lower main frames 57, 58 (only reference numeral 57 representing the lower main frame on the proximal side is shown), a pair of right and left L-shaped frames 62, 62 (only reference numeral 62 representing the L-shaped frame on the proximal side is shown), a pair of left and right upright frames 63, 63 (only reference numeral 63 representing the upright frame on the proximal side is shown), and a pair of left and right front frames 64, 64 (only reference numeral 64 representing the front frame on the proximal side is shown). The upper main frames 55, 56 extend in the fore-aft direction. The lower main frames 57, 58 are disposed downwardly of the upper main frames 55, 56 and are connected to front ends and rear ends of the upper main frames 55, 56. The L-shaped frames 62, 62 are mounted to a front portion of the upper main frames 55, 56 so as to support a middle portion of the input shaft 24. The upright frames 63, 63 also support the middle portion of the input shaft 24. The front frames 64, 64 support the front carrier 36.

The vehicle body frame 11 further includes front portion inclined portions 66, 66 (only reference numeral 66 representing the front portion inclined portion on the proximal side is shown), a pair of left and right inclined frames 67, 67 (only reference numeral 67 representing the inclined frame on the proximal side is shown), a pair of left and right sub-inclined frames 68, 68 (only reference numeral 68 representing the sub-inclined frame on the proximal side is shown), a pair of left and right curved frames 71, 71 (only reference numeral 71 representing the curved frame on the proximal side is shown), a pair of left and right rear first frames 72, 72 (only reference numeral 72 representing the rear first frame on the proximal side is shown), and a pair of right and left rear second frames 73, 73 (only reference numeral 73 representing the rear second frame on the proximal side is shown). The front portion inclined portions 66, 66 are disposed at a front portion of the upper main frames 55, 56. The inclined frames 67, 67 are mounted across the front portion inclined portions 66, 66 and the lower main frames 57, 58. The sub-inclined frames 68, 68 are mounted across the inclined frames 67, 67 and the front portion inclined portions 66, 66 so as to support a lower portion of the motor-driven power steering apparatus 22. The curved frames 71, 71 are mounted to rear ends of the upper main frames 55, 56 and rear portions of the lower main frames 57, 58, respectively. The rear first frames 72, 72 are mounted to upper portions of rear end portions of the upper main frames 55, 56 so as to support a front portion of the rear carrier 46. The rear second frames 73, 73 are mounted on the curved frames 71, 71 so as to support a rear portion of the rear carrier 46.

Figure 2:
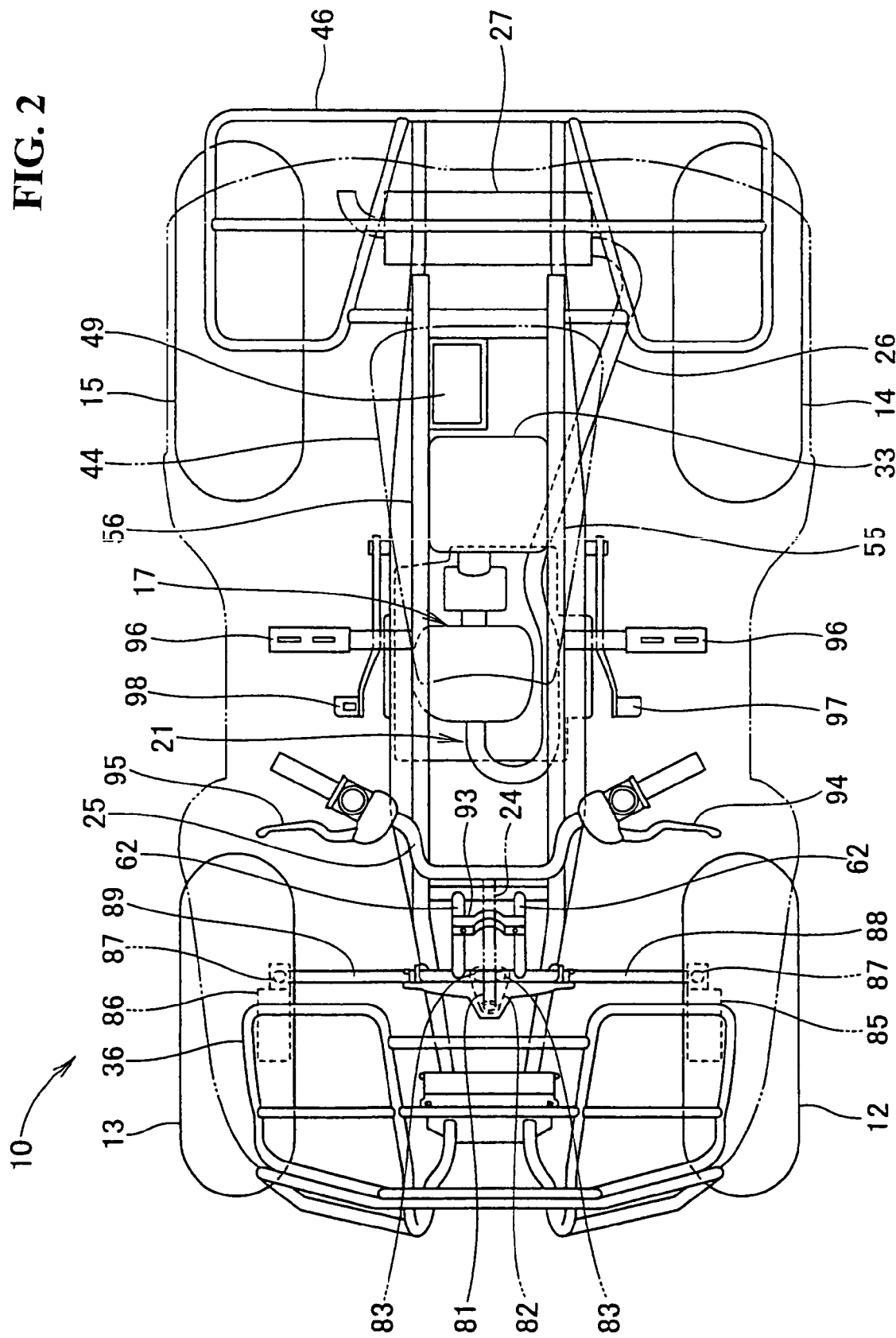
FIG. 2 is a plan view showing the all terrain vehicle according to the embodiment of the present invention.

FIG. 2 is a plan view showing the all terrain vehicle according to the embodiment of the present invention. At a front portion of the all terrain vehicle 10, the vehicle 10 includes an output shaft 81, a center arm 82, and telescopic tie rods 88, 89. The output shaft 81 is disposed downwardly of the input shaft 24. The center arm 82 is mounted on a lower end of the output shaft 81 (to be described in detail later) so as to transmit rotation of the handlebar 25 for steering the front wheels 12, 13. One end each of the tie rods 88, 89 is connected to the center arm 82 via a corresponding one of ball joints 83, 83. The other end each of the tie rods 88, 89 is connected to a corresponding one of knuckles 85, 86 on the side of the front wheels 12, 13 via a corresponding one of ball joints 87, 87. The output shaft 81, the center arm 82, the ball joints 83, 83, the tie rods 88, 89, and the ball joints 87, 87 are included in the motor-driven power steering apparatus 22.

A steering holder base portion 93 is placed across the L-shaped frames 62, 62 so as to rotatably support the input shaft 24. A clutch lever 94 is provided together with a brake lever 95 for the front wheels, foot rests 96, 96, a gear change pedal 97 and a brake pedal 98 for the rear wheels.

Figure 3:
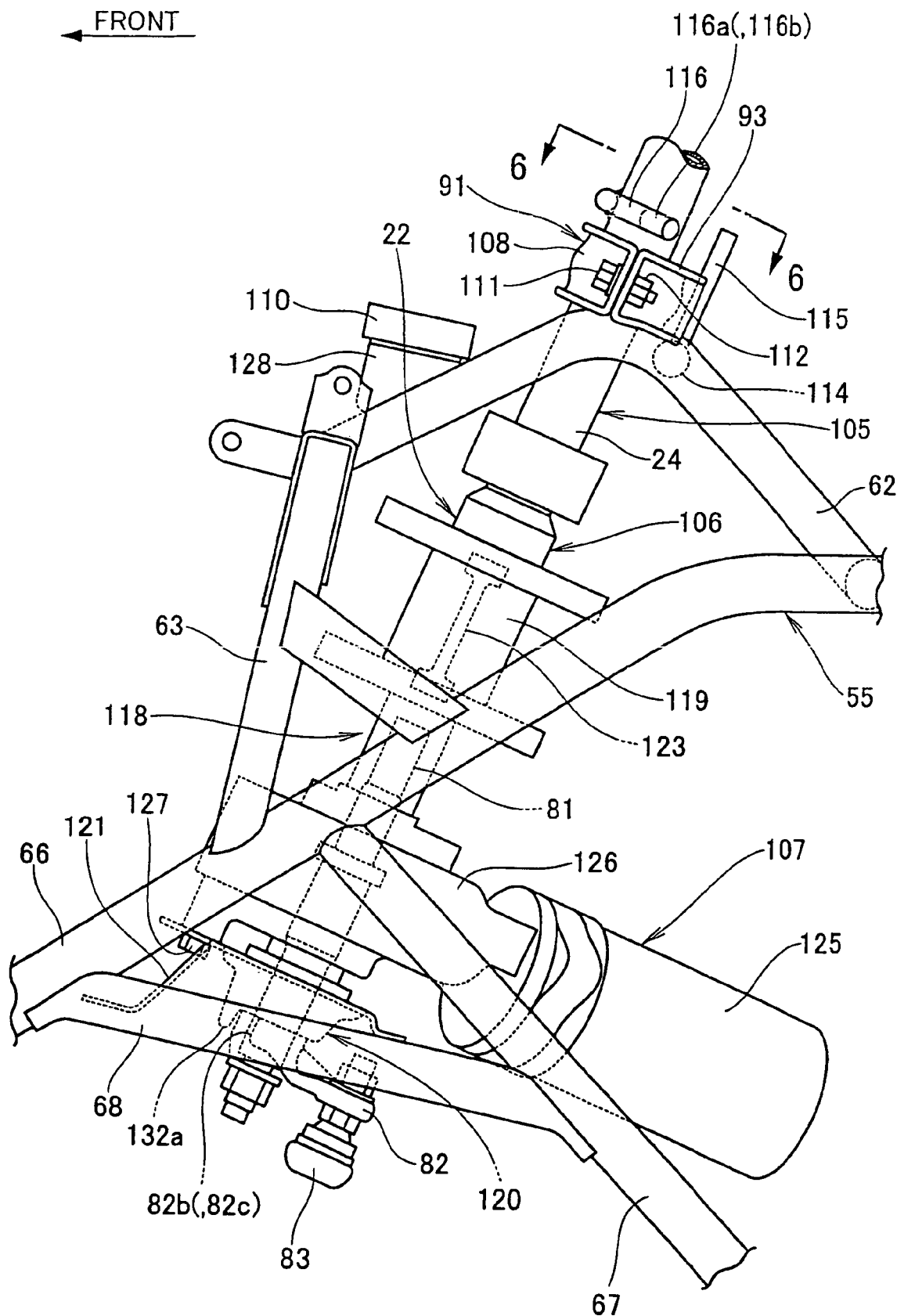
FIG. 3 is a side elevational view showing principal parts of a front portion of the all terrain vehicle according to the present invention.

FIG. 3 is a side elevational view the showing principal parts of a front portion of the all terrain vehicle according to the present invention (an arrow (FRONT) shown in FIG. 3 points toward front of the vehicle; the same applies hereunder). The motor-driven power steering apparatus 22 includes a steering device 105, a torque sensor portion 106, a power assist portion 107, and a control portion 110. The steering device 105 steers the front wheels. The torque sensor portion 106 detects a steering torque. The power assist portion 107 generates a power drive for providing an assistive force with a steering force. The control portion 110 controls the power assist portion 107 based on the steering torque detected by the torque sensor portion 106 or the like.

The steering device 105 includes the handlebar 25 (see FIG. 1), the input shaft 24, the output shaft 81 connected to the input shaft 24 via the torque sensor portion 106, the center arm 82 mounted on a lower end portion of the output shaft 81, the ball joints 83, 83 (only reference numeral 83 representing the ball joint on the proximal side is shown), the tie rods 88, 89 (see FIG. 2), and the ball joints 87, 87 (see FIG. 2).

The input shaft 24 is located downwardly of the handlebar 25 and is rotatably supported on an input shaft bearing portion 91.

The input shaft bearing portion 91 includes the steering holder base portion 93 placed across the left and right L-shaped frames 62, 62 (only reference numeral 62 representing the L-shaped frame on the proximal side is shown) and is fastened to a holder tab 108 fitted to the steering holder base portion 93 via a bushing (not shown). A bolt 111 and a nut 112 are provided, respectively, for attaching the holder tab 108 to the steering holder base portion 93. A pair of left and right ones of bolts and nuts are provided.

The L-shaped frames 62, 62 are connected together with a cross pipe 114. The cross pipe 114 is a lock member including an upwardly projecting tab 115 that runs substantially in parallel with the input shaft 24.

The upwardly projecting tab 115 is a member functioning as a stopper for restricting a swing range of an arm tab 116 fitted to the input shaft 24. More specifically, the upwardly projecting tab 115 is a stopper for restricting the range of the rotational angle of the input shaft 24.

The input shaft 24 and the output shaft 81 constitute a steering shaft 118.

The output shaft 81 is rotatably supported by an output shaft bearing portion 120 disposed downwardly of a sensor housing 119 included in the torque sensor portion 106.

The output shaft bearing portion 120 is supported on a bottom plate 121 mounted on the left and right sub-inclined frames 68, 68 (only reference numeral 68 representing the sub-inclined frame on the proximal side is shown). A reduction gear 126 included in the power assist portion 107 is also supported on the bottom plate 121. A bolt 127 (showing only one of a plurality of bolts installed) is provided for mounting the reduction gear 126 to the bottom plate 121.

The torque sensor portion 106 is a torsion bar 123 disposed between the side of the input shaft 24 and the side of the output shaft 81. When the input shaft 24 is turned through operation of the handlebar 25 (see FIG. 2), a relative rotational angle is produced in the input shaft 24 and the output shaft 81, which twists the torsion bar 123. An amount of this twist is translated to a corresponding value of torque to determine the steering torque.

The power assist portion 107 includes an electric motor 125, a clutch (not shown), and the reduction gear 126. The clutch is inserted between an output shaft of the electric motor 125 and a middle portion of the output shaft 81. The reduction gear 126 includes a worm gear and a worm wheel.

The control portion 110 controls the power assist portion 107 based on the steering torque detected by the torque sensor portion 106, a steering angle of the handlebar 25 (see FIG. 1), a vehicle speed of the all terrain vehicle 10, and other process data available during operation of the vehicle. A bracket 128 is mounted on the L-shaped frame 62 so as to support the control portion 110.

Figure 4:
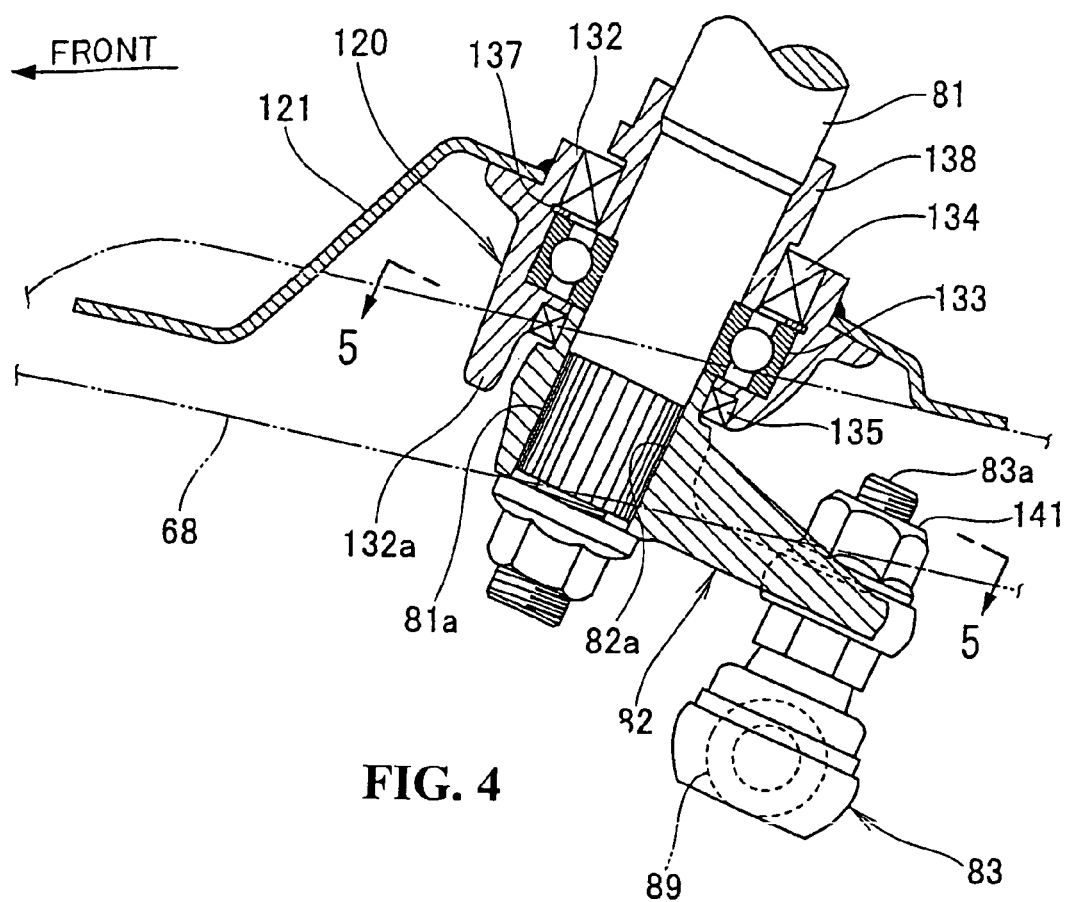
FIG. 4 is a cross-sectional view showing an output shaft lower end support portion according to the embodiment of the present invention.

FIG. 4 is a cross-sectional view showing an output shaft lower end support portion according to the embodiment of the present invention. The output shaft bearing portion 120 includes a shaft support member 132, a bearing 133, and sealing members 134, 135. The shaft support member 132 is mounted at a central portion of the bottom plate 121. The bearing 133 is mounted on the shaft support member 132 so as to rotatably support the output shaft 81. The sealing members 134, 135 protect the bearing 133 from dust and the like. A snap ring 137 is provided for preventing the bearing 133 from coming off the shaft support member 132. A collar 138 is mounted adjacent to the bearing 133.

The shaft support member 132 includes a downwardly projecting portion 132a. The downwardly projecting portion 132a is formed on a forward side of the vehicle so as to project downwardly substantially along the output shaft 81.

Female splines 82a formed in the center arm 82 are in splined connection with male splines 81a formed on the lower end portion of the output shaft 81.

The ball joint 83 is a member mounted to a rear portion of the center arm 82 with a bolt portion 83a disposed on an end portion of the ball joint 83 and a nut 141.

Figure 5:
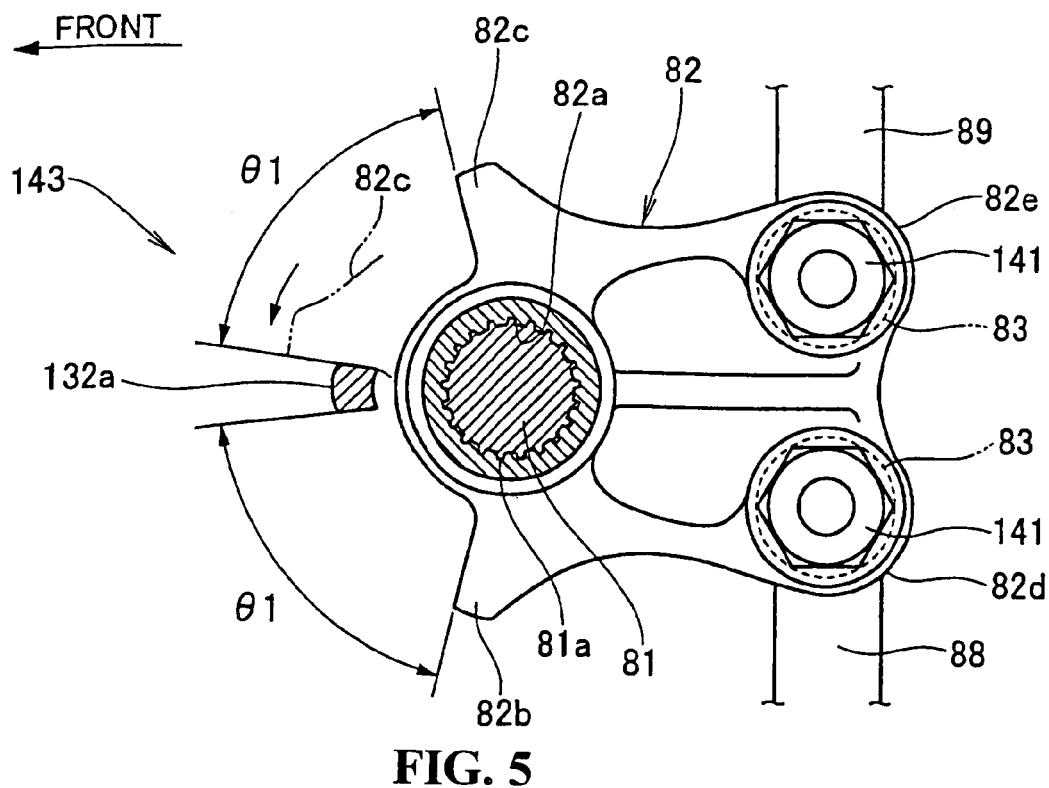
FIG. 5 is a cross-sectional view taken along line 5-5 of FIG. 4.

FIG. 5 is a cross-sectional view taken along line 5-5 of FIG. 4. The center arm 82 is a member integrating side projecting portions 82b, 82c with tie rod connection portions 82d, 82e. The side projecting portions 82b, 82c are disposed leftwardly and rightwardly, respectively, of the female splines 82a. The tie rod connection portions 82d, 82e are connected to the tie rods 88, 89 via the ball joints 83, 83, respectively.

When the center arm 82 is rotated as the output shaft 81 rotates, either one of the side projecting portions 82b, 82c abuts on the downwardly projecting portion 132a of the shaft support member 132 (see FIG. 4) so that a rotational range is restricted. The center arm 82 is positioned as shown in FIG. 5 when the handlebar 25 (see FIG. 2) is in a position equivalent to the vehicle's traveling in a straight ahead direction. A swing angular range θ1 is provided for the center arm 82 rotating in the clockwise and counterclockwise directions from the position equivalent to the vehicle's traveling in the straight ahead direction. The swing angular range also represents a rotational angular range of the output shaft 81.

The side projecting portions 82b, 82c and the downwardly projecting portion 132a form part of an output shaft stopper mechanism 143.

FIG. 6 is a cross-sectional view taken along line 6-6 of FIG. 3. When the arm tab 116 is swung as the input shaft 24 rotates, side projecting portions 116a, 116b of the arm tab 116 abuts on the upwardly projecting tab 115 on the side of the cross pipe 114 so that the swing range is restricted. The arm tab 116 is positioned as shown in FIG. 6 when the handlebar 25 (see FIG. 2) is in the position equivalent to the vehicle's traveling in the straight ahead direction. A swing angular range θ2 is provided for the arm tab 116 rotating in the clockwise and counterclockwise directions from the position equivalent to the vehicle's traveling in the straight ahead direction. The swing angular range also represents a rotational angular range of the input shaft 24. The side projecting portions 116a, 116b and the upwardly projecting tab 115 form part of an input shaft stopper mechanism 145.

As described with reference to FIGS. 3, 5, and 6 in the foregoing, the present invention is applied to the all terrain vehicle 10 (see FIG. 1) having the input shaft 24 disposed on the side of the handlebar 25 and the output shaft 81 disposed on the side of the front wheels 12, 13 (see FIG. 1) as left and right wheels. More specifically, the input shaft 24 and the output shaft 81 are connected together through the torque sensor portion 106 of the motor-driven power steering apparatus 22 and the electric motor 125 as the power assist motor included in the motor-driven power steering apparatus 22 is driven in accordance with the relative rotational angle in the input shaft 24 and the output shaft 81. An embodiment of the present invention includes the side projecting portions 116a, 116b functioning as a first lock member secured to the input shaft 24 with the upwardly projecting tab 115 functioning as a first stopper secured the vehicle body at positions corresponding to the side projecting portions 116a, 116b so as to restrict the swing range of the side projecting portions 116a, 116b and the side projecting portions 82b, 82c functioning as a second lock member secured to the output shaft 81. The downwardly projecting portion 132a function as a second stopper secured to the vehicle body at positions corresponding to the side projecting portions 82b, 82c so as to restrict the swing range of the side projecting portions 82b, 82c.

The all terrain vehicle 10 includes the side projecting portions 116a, 116b on the side of the input shaft 24, the upwardly projecting tab 115 on the side of the vehicle body, the side projecting portions 82b, 82c on the side of the output shaft 81, and the downwardly projecting portion 132a on the side of the vehicle body. Thus, the upwardly projecting tab 115 and the downwardly projecting portion 132a are disposed on an upstream side and a downstream side, respectively, in transmission of the steering force of the motor-driven power steering apparatus 22. This allows the rotational range of the input shaft 24 through operation of the handlebar 25 to be restricted. Accordingly, even when the vehicle negotiates a road surface having bumps and potholes, it is possible to restrict the rotational range of the output shaft 81 that can be varied by the front wheels 12, 13 turned forcibly clockwise or counterclockwise by the road surface. This makes it possible to maintain positively the relative rotational angle in the input shaft 24 and the output shaft 81 within a predetermined angle or less. Accordingly, it is possible, for example, to prevent an excessive torque from being applied to the torque sensor portion and thus reduce load on the electric motor 125.

An embodiment of the present invention includes the upwardly projecting tab 115 and the downwardly projecting portion 132a that make the rotational range of the input shaft 24 equivalent to the rotational range of the output shaft 81, or more specifically, $\theta 1 = \theta 2$.

The rotational range of the input shaft 24 is made to be equal to the rotational range of the output shaft 81 because of the upwardly projecting tab 115 and the downwardly projecting portion 132a. Accordingly, when the side of the input shaft 24 is locked on the upwardly projecting tab 115, the side of the output shaft 81 is invariably locked on the downwardly projecting portion 132a. This eliminates difference in the relative rotational angle in the input shaft 24 and the output shaft 81, which keeps the electric motor 125 inactive. As a result, power consumption of the electric motor 125 can be reduced and the amount of discharge from the battery 49 can be suppressed.

An embodiment of the present invention includes the input shaft 24 and the output shaft 81 that are connected via the torsion bar 123.

The input shaft 24 is connected to the output shaft 81 through the torsion bar 123. Accordingly, the torsion bar 123 can be prevented from being excessively twisted by restricting the rotational range of each of the input shaft 24 and the output shaft 81 using the upwardly projecting tab 115 and the downwardly projecting portion 132a, respectively.

As described with reference to FIGS. 2 and 5 in the foregoing, an embodiment of the present invention includes the side projecting portions 82b, 82c that are disposed on the center arm 82 that is mounted on the output shaft 81 and that connects to the left and right tie rods 88, 89 for steering the right and left front wheels 12, 13.

The center arm 82 includes the side projecting portions 82b, 82c. This allows the center arm 82 to serve also as a supporting member for the side projecting portions 82b, 82c. The number of parts used can thereby be reduced for the reduced cost.

As described with reference to FIGS. 3 and 5 in the foregoing, an embodiment of the present invention includes the side projecting portions 116a, 116b that are disposed upwardly of the input shaft bearing portion 91 and the side projecting portions 82b, 82c that are disposed downwardly of the output shaft bearing portion 120.

The side projecting portions 116a, 116b on the side of the input shaft 24 and the side projecting portions 82b, 82c on the side of the output shaft 81 are arranged away from the torsion bar 123. This helps make it more difficult for a large torque to be transmitted from the side of the input shaft 24 or the side of the output shaft 81 to the torsion bar 123. As a result, the torsion bar 123 can be further prevented from being twisted excessively.

FIGS. 7(a) and 7(b) are side elevational views showing principal parts of the input shaft stopper mechanism according to other embodiments of the present invention. Like parts are identified by the same reference numerals as in the embodiment of the present invention shown in FIGS. 3 and 6 and descriptions therefor will be omitted.

FIG. 7(a) is a view showing an arrangement, in which a cross pipe 114 includes a downwardly projecting tab 151 and an arm tab 116 is mounted at a position downwardly from a holder tab 108 of an input shaft 24, thereby allowing the downwardly projecting tab 151 to restrict the swing range of the arm tab 116.

Side projecting portions 116a, 116b (only reference numeral 116a representing the side projecting portion on the proximal side is shown) of the arm tab 116 and the downwardly projecting tab 151 constitute an input shaft stopper mechanism 153.

FIG. 7(b) is a view showing an arrangement, in which a steering holder base portion 93 includes an upper projecting tab 155 disposed on an upper portion thereof and the upwardly projecting tab 155 restricts the swing range of an arm tab 116.

Side projecting portions 116a, 116b (only reference numeral 116a representing the side projecting portion on the proximal side is shown) of the arm tab 116 and the upwardly projecting tab 155 constitute an input shaft stopper mechanism 156. It is appropriate that a bracket (not shown) be disposed on an L-shaped frame 62 ahead of the input shaft 24. The bracket has a projecting tab so that the projecting tab and the arm tab 116 constitute the input shaft stopper mechanism.

If priority is given to assemblability of the input shaft stopper mechanisms 145 (see FIG. 6), 153 (see FIG. 7(a)), 156 (see FIG. 7(b)) and the output shaft stopper mechanism 143 (see FIG. 5) described in the foregoing, the input shaft stopper mechanisms 145, 153, 156 and the output shaft stopper mechanism 143 may not function at the same time.

In this case, by making the input shaft stopper mechanisms 145, 153, 156 function prior to the output shaft stopper mechanism 143, it is possible to prevent an excessive torque based on operation of the handlebar by an occupant from acting on the torsion bar 123 (see FIG. 3). By making the output shaft stopper mechanism 143 function prior to the input shaft stopper mechanisms 145, 153, 156, on the other hand, it is possible to prevent an excessive torque based on a reaction force of a tire occurring from bumps and potholes in the road surface from acting on the torsion bar 123.

Figure 8:
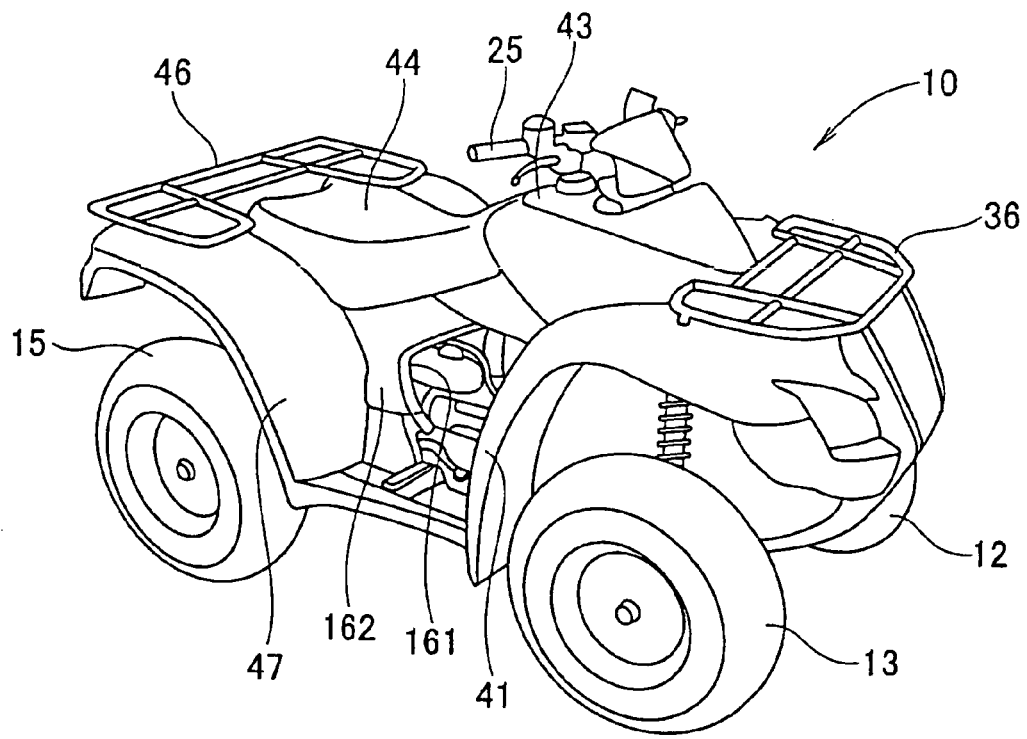
FIG. 8 is a perspective view showing a right side surface of the all terrain vehicle according to the present invention.

FIG. 8 is a perspective view showing a right side surface of the all terrain vehicle according to an embodiment of the present invention. FIG. 8 shows that the all terrain vehicle 10 includes an opening portion 161 for maintenance that is disposed downwardly of a side portion of the seat 44 between the front fender 41 and the rear fender 47. FIG. 8 also shows that there is a removable vehicle body side cover 162 that forms a trailing end of the opening portion 161.

Figure 9:
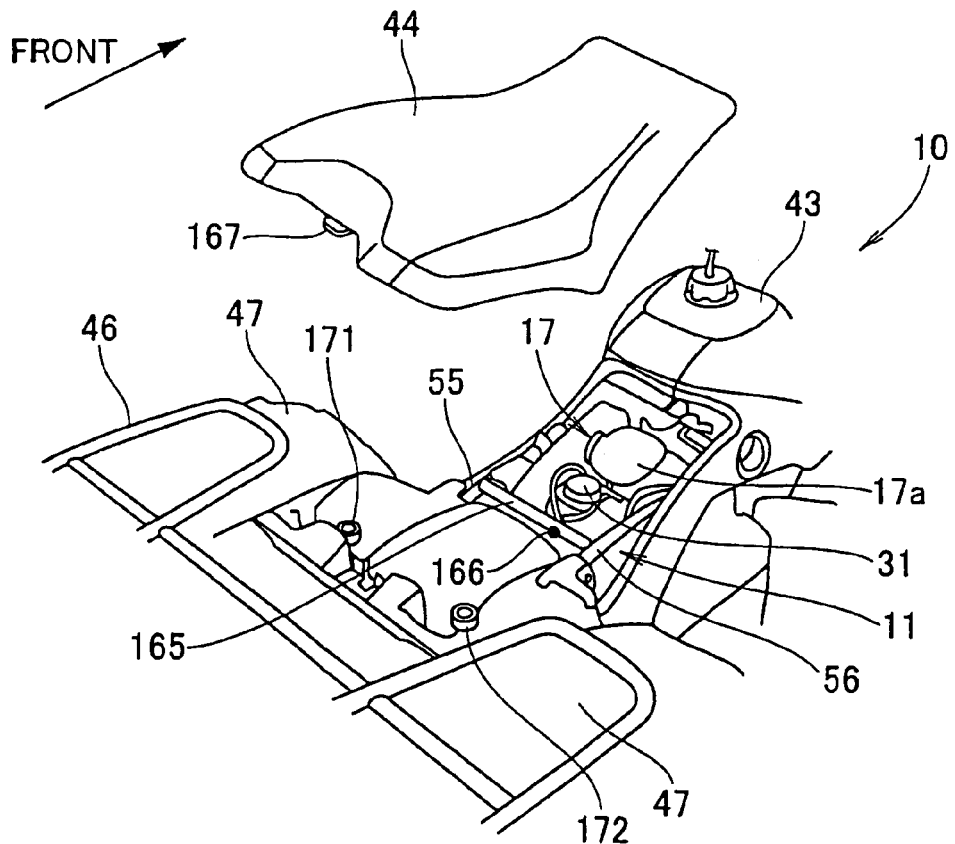
FIG. 9 is a perspective view showing principal parts indicating a manual switch for shutting down the supply of electric power to an electric motor of the motor-driven power steering apparatus according to the embodiment of the present invention.

FIG. 9 is a perspective view showing principal parts indicating the manual switch for shutting down the supply of electric power to the electric motor of the motor-driven power steering apparatus according to an embodiment of the present invention. FIG. 9 shows a condition in which the seat 44 has been removed from the all terrain vehicle 10. FIG. 9 shows that the manual switch 166 (indicated by a black dot in FIG. 9), which can shut down the supply of the electric power from the battery 49 (see FIG. 1) to the electric motor 25 (see FIG. 3) of the motor-driven power steering apparatus 22 (see FIG. 3), is disposed at a cross pipe 165 mounted across the left and right upper main frames 55, 56 of the vehicle body frame 11, downwardly of the seat 44 when the seat 44 is mounted in place.

The seat 44 is installed as follows. More specifically, a projecting portion (not shown), disposed at a front portion on the bottom of the seat 44, is inserted in the vehicle body side to lock the seat 44 in position. Then, a hook disposed in a rear portion on the bottom of the seat 44 is locked into the vehicle body side so that the seat 44 is locked in place.

The seat 44 is opened as follows. More specifically, the hook locked in place in the vehicle body side is swung by operating a lever 167 disposed in the rear portion of the seat 44. The hook is thereby unlocked from the vehicle body side and the rear portion of the seat 44 is opened. In this condition, the projecting portion locked to the vehicle body side is pulled so that the front portion of the seat 44 is unlocked. Cushion rubbers 171, 172 are provided for supporting the bottom of the rear portion of the seat 44. The cushion rubbers are disposed on the side of the vehicle body frame 11.

As described in the foregoing, the manual switch 166 that can shut down the supply of electric power to the electric motor 125 is disposed downwardly of the seat 44. This arrangement allows the occupant (a rider or a passenger) of the vehicle to arbitrarily turn off the manual switch 166 to shut down the supply of the electric power to the electric motor 125. The arrangement also allows the seat 44 to protect the manual switch 166. The manual switch 166 is not therefore exposed to rainwater, mud, or the like and can be prevented from operating erratically due to interference from an external environment.

In addition, the battery 49 (see FIG. 1) is disposed at a position (see FIG. 2 also), at which a maintenance service job is performed by opening the seat 44. This allows the manual switch 166 to be operated as part of a series of operations performed for servicing the battery 49, for example, for recharging the battery 49 or the like. This ensures good operability for the occupant.

Figure 10:
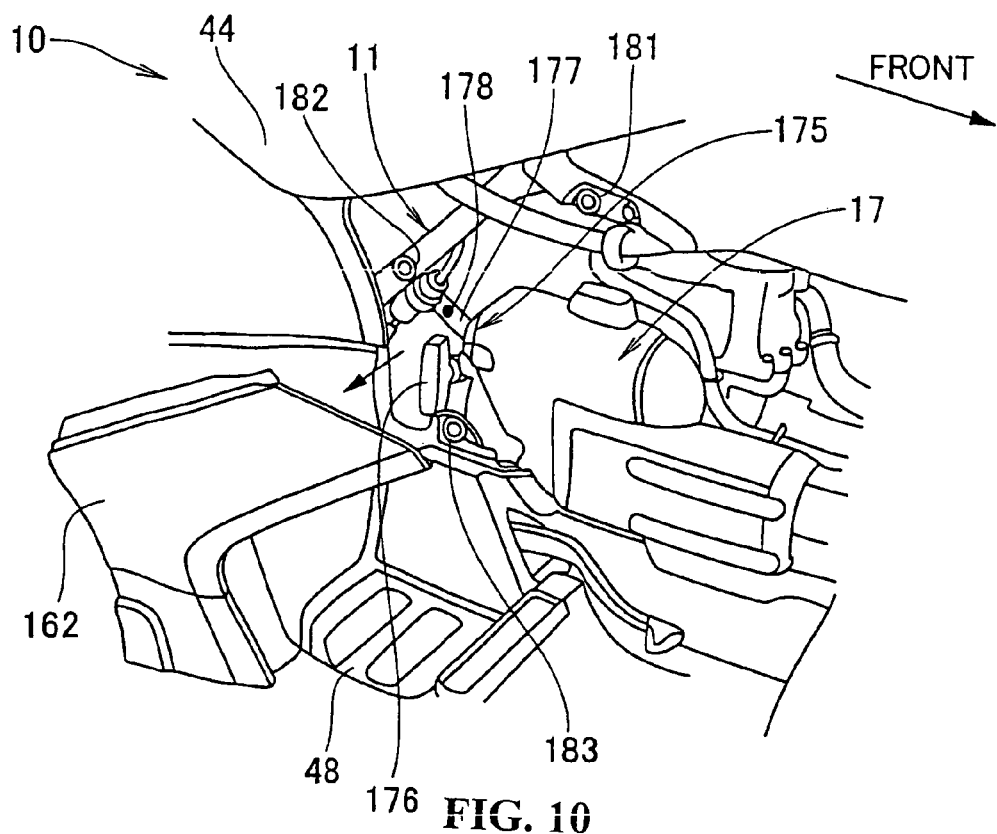
FIG. 10 is a perspective view showing principal parts indicating a manual switch for shutting down the supply of the electric power to the electric motor of the motor-driven power steering apparatus according to another embodiment of the present invention.

FIG. 10 is a perspective view showing principal parts indicating a manual switch for shutting down the supply of the electric power to the electric motor of the motor-driven power steering apparatus according to another embodiment of the present invention. FIG. 10 shows a condition, in which the vehicle body side cover 162 has been removed from the all terrain vehicle 10. FIG. 10 shows that the engine 17 includes a recoil starter 175 for manually starting the engine 17. The recoil starter 175 is disposed in a rear portion of the engine 17 inside the vehicle body side cover 162 when the vehicle body side cover 162 is mounted in place. FIG. 10 further shows that the recoil starter 175 includes a knob 176 mounted on a leading end of a wound rope. Further, there is disposed near the knob 176, or more specifically, on a bracket 177 mounted on the side of the vehicle body frame 11 a manual switch 178 (indicated by a black dot in FIG. 10) that can shut down the supply of the electric power from the battery 49 (see FIG. 1) to the electric motor 125 (see FIG. 3) of the motor-driven power steering apparatus 22 (see FIG. 3). Cover mounting portions 181 are provided for removably attaching the vehicle body side cover 162. The cover mounting portions 181 to 183 are disposed on the side of the vehicle body frame 11.

When the engine 17 (see FIG. 1) becomes difficult to start with a starter, causing the occupant (the rider or the passenger) to determine that there is a drop in the terminal voltage of the battery 49, the vehicle body side cover 162 is removed and the manual switch 178 is turned off. The knob 176 is then pulled to operate the recoil starter 175 and the engine 17 is thereby started.

As described above, operating the manual switch 178 and operating the knob 176 can be a continuous and successive sequence of operations with substantially no time intervals therebetween. This contributes to good operability and ease of use.

Figure 11:
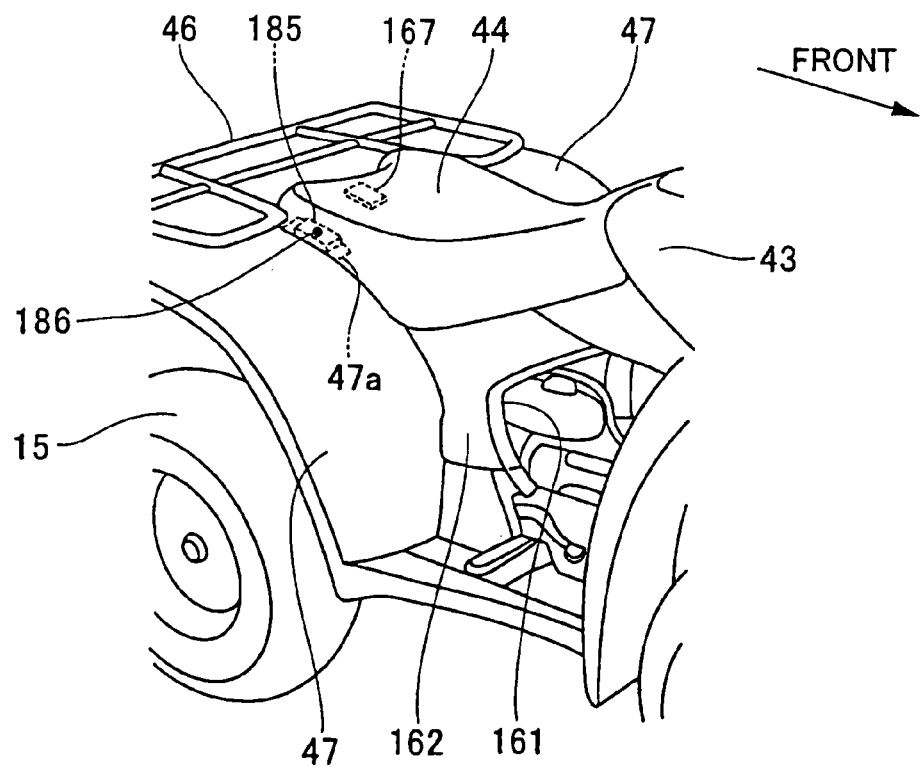
FIG. 11 is a perspective view showing principal parts indicating a manual switch for shutting down the supply of the electric power to the electric motor of the motor-driven power steering apparatus according to still another embodiment of the present invention.

FIG. 11 is a perspective view showing principal parts indicating the manual switch for shutting down the supply of electric power to the electric motor of the motor-driven power steering apparatus according to still another embodiment of the present invention. FIG. 11 shows that the rear fender 47, made of resin, includes a switch mounting portion 47a disposed on an upper portion thereof downwardly of the seat 44. FIG. 11 further shows that a manual switch 186 (indicated by a black dot in FIG. 11), which can shut down the supply of electric power to the electric motor 125 (see FIG. 3) of the motor-driven power steering apparatus 22 (see FIG. 3), is mounted on the switch mounting portion 47a via a rubber 185.

The manual switch 186 is disposed near the lever 167 for opening and closing the seat 44. This arrangement allows the manual switch 186 to be operated easily when the seat 44 is opened. In addition, the manual switch 186 is disposed downwardly of the seat 44. This arrangement allows the seat 44 to protect the manual switch 186.

Moreover, the rubber 185 helps prevent vehicle body vibration from being easily transmitted to the manual switch 186. This extends the service life of the manual switch 186.

Figures 12A, 12B, 12C:
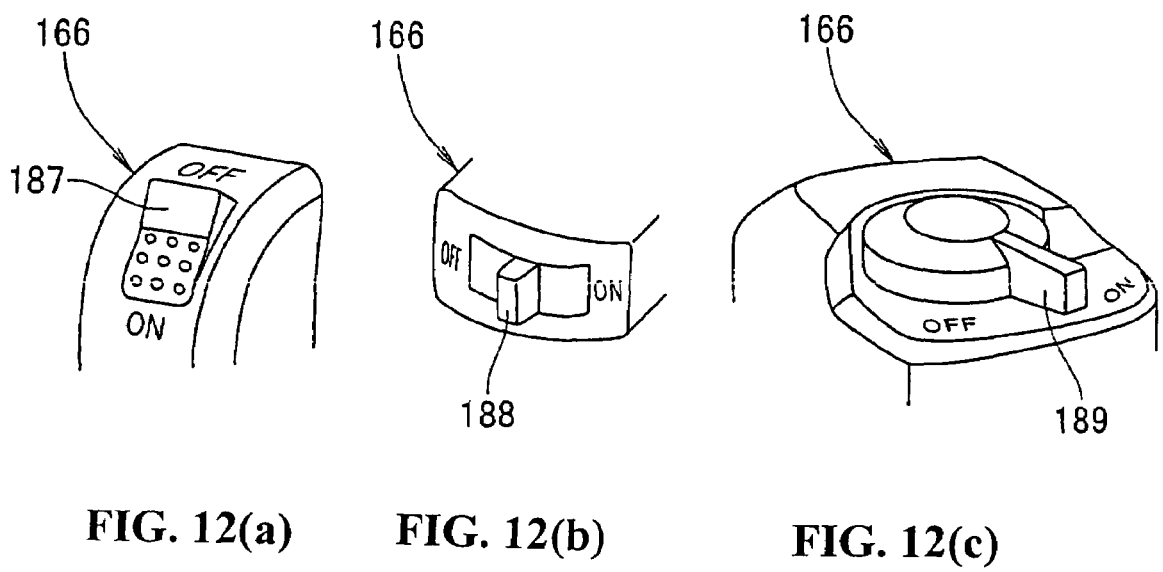
FIGS. 12(a), 12(b), and 12(c) are perspective views showing examples of the manual switch according to the present invention.

FIGS. 12(a), 12(b), and 12(C) are perspective views showing examples of the manual switch according to the present invention.

The manual switch 166 (or the manual switch 178 (see FIG. 10) or the manual switch 186 (see FIG. 11)) shown in FIG. 12(a) is a rocker switch including an operated portion 187 that can be rocked back and forth to select a switch position of ON or OFF.

The manual switch 166 (or the manual switch 178 (see FIG. 10) or the manual switch 186 (see FIG. 11)) shown in FIG. 12(b) is a slide switch including an operated portion 188 that can be slid into an ON or OFF position, or a snap-action switch including an operated portion 188 that can be lowered into an ON or OFF position.

The manual switch 166 (or the manual switch 178 (see FIG. 10) or the manual switch 186 (see FIG. 11)) shown in FIG. 12(c) is a rotary switch including an operated portion 189 that can be rotated through a predetermined angle to select an ON or OFF position.

In the embodiment of the present invention, the center arm 82 includes the side projecting portions 82b, 82c and the shaft support member 132 includes the downwardly projecting portion 132a as shown in FIGS. 4 and 5. The present invention is not limited to these arrangements. Rather, it is appropriate that the side of the output shaft 81 be arranged to include a pair of projecting portions. In addition, a case of the reduction gear 126 is arranged to include a projecting portion functioning as a stopper for restricting the swing range of the pair of the projecting portions.

The present invention is preferably applicable to an all terrain vehicle having a motor-driven power steering apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An all terrain vehicle having an input shaft disposed on a side of a handlebar and an output shaft disposed on a side of left and right wheels, the input shaft and the output shaft being connected together via a motor-driven power steering apparatus, and driving a power assist motor included in the motor-driven power steering apparatus in accordance with a relative rotational angle in the input shaft and the output shaft, the all terrain vehicle comprising:
    a first lock member secured to an upper portion of the input shaft in a position separate from the output shaft;
    a first stopper secured to a vehicle body at a position corresponding to the first lock member, the first stopper for restricting a swing range of the first lock member;
    a second lock member secured to the output shaft; and
    a second stopper secured to the vehicle body at a position corresponding to the second lock member, the second stopper for restricting a swing range of the second lock member.

2. The all terrain vehicle according to claim 1, wherein the first stopper and the second stopper make a rotational range of the input shaft equivalent to a rotational range of the output shaft.

3. The all terrain vehicle according to claim 1, further comprising:
    a torque sensor portion; and
    a control portion adapted to control the power assist motor based on a steering torque detected by the torque sensor portion.

4. The all terrain vehicle according to claim 1, wherein the second lock member is disposed on a center arm that is mounted on the output shaft and connected to right and left tie rods for steering the right and left wheels,
    wherein the center arm and the power assist motor both extend rearwardly from the output shaft.

5. The all terrain vehicle according to claim 2, wherein the second lock member is disposed on a center arm that is mounted on the output shaft and connected to right and left tie rods for steering the right and left wheels,
    wherein the center arm is connected to the right and left tie rods via ball joints.

6. The all terrain vehicle according to claim 3, wherein the control portion is mounted on a frame member in a position above the torque sensor portion.

7. An all terrain vehicle having an input shaft disposed on a side of a handlebar and an output shaft disposed on a side of left and right wheels, the input shaft and the output shaft being connected together via a motor-driven power steering apparatus, and driving a power assist motor included in the motor-driven power steering apparatus in accordance with a relative rotational angle in the input shaft and the output shaft, the all terrain vehicle comprising:
    a first lock member secured to the input shaft;
    a first stopper secured to a vehicle body at a position corresponding to the first lock member, the first stopper for restricting a swing range of the first lock member;
    a second lock member secured to the output shaft; and
    a second stopper secured to the vehicle body at a position corresponding to the second lock member, the second stopper for restricting a swing range of the second lock member,
    wherein the first lock member is disposed upwardly of a bearing portion of the input shaft and the second lock member is disposed downwardly of a bearing portion of the output shaft.

8. The all terrain vehicle according to claim 1, wherein the first lock member is disposed upwardly of a bearing portion of the input shaft and the second lock member is disposed downwardly of a bearing portion of the output shaft.

9. A device for limiting the rotation of a steering shaft for use with an all terrain vehicle having an input shaft disposed on a side of a handlebar and an output shaft disposed on a side of left and right wheels, the input shaft and the output shaft being connected together via a motor-driven power steering apparatus, and a power assist motor included in the motor-driven power steering apparatus which is driven in accordance with a relative rotational angle in the input shaft and the output shaft, the device comprising:
    a first lock member adapted to be secured to the input shaft;
    a first stopper adapted to be secured to a vehicle body at a position corresponding to the first lock member, the first stopper being adapted for restricting a swing range of the first lock member;
    a second lock member adapted to be secured to the output shaft; and
    a second stopper adapted to be secured to the vehicle body at a position corresponding to the second lock member, the second stopper being adapted for restricting a swing range of the second lock member,
    wherein the first lock member is disposed upwardly of a bearing portion of the input shaft and the second lock member is disposed downwardly of a bearing portion of the output shaft.

10. The device for limiting the rotation of a steering shaft for use with an all terrain vehicle according to claim 9, wherein the first stopper and the second stopper make a rotational range of the input shaft equivalent to a rotational range of the output shaft.

11. The device for limiting the rotation of a steering shaft for use with an all terrain vehicle according to claim 9, wherein the input shaft and the output shaft are connected via a torsion bar.

12. The device for limiting the rotation of a steering shaft for use with an all terrain vehicle according to claim 10, wherein the input shaft and the output shaft are connected via a torsion bar.

13. The device for limiting the rotation of a steering shaft for use with an all terrain vehicle according to claim 9, wherein the second lock member is disposed on a center arm that is mounted on the output shaft and connected to right and left tie rods for steering the right and left wheels.

14. The device for limiting the rotation of a steering shaft for use with an all terrain vehicle according to claim 10, wherein the second lock member is disposed on a center arm that is mounted on the output shaft and connected to right and left tie rods for steering the right and left wheels.

15. The device for limiting the rotation of a steering shaft for use with an all terrain vehicle according to claim 11, wherein the second lock member is disposed on a center arm that is mounted on the output shaft and connected to right and left tie rods for steering the right and left wheels.

16. The device for limiting the rotation of a steering shaft for use with an all terrain vehicle according to claim 12, wherein the second lock member is disposed on a center arm that is mounted on the output shaft and connected to right and left tie rods for steering the right and left wheels.

* * * * *